(12) United States Patent
Ahdoot et al.

(10) Patent No.: US 9,464,660 B2
(45) Date of Patent: Oct. 11, 2016

(54) TAMPER-RESISTANT BICYCLE AXLE NUT

(71) Applicant: Revlock, LLC, Los Angeles, CA (US)

(72) Inventors: Michael Ahdoot, Los Angeles, CA (US); Amir Atighehchi, Los Angeles, CA (US); Owen Zheng, Los Angeles, CA (US); Huy Tran, Los Angeles, CA (US); Jazzmin Martinez, Los Angeles, CA (US)

(73) Assignee: Revlock, LLC, Los Angeles, CA (US)

( * ) Notice: Subject to any disclaimer, the term of this patent is extended or adjusted under 35 U.S.C. 154(b) by 26 days.

(21) Appl. No.: 14/732,103

(22) Filed: Jun. 5, 2015

(65) Prior Publication Data

US 2015/0354620 A1    Dec. 10, 2015

Related U.S. Application Data

(60) Provisional application No. 62/010,125, filed on Jun. 10, 2014.

(51) Int. Cl.
| | |
|---|---|
| *F16B 35/06* | (2006.01) |
| *F16B 41/00* | (2006.01) |
| *B62K 25/02* | (2006.01) |
| *F16B 23/00* | (2006.01) |

(Continued)

(52) U.S. Cl.
CPC ........... *F16B 41/005* (2013.01); *B25B 13/485* (2013.01); *B25B 27/0071* (2013.01); *B62H 5/001* (2013.01); *B62K 25/02* (2013.01); *F16B 23/0061* (2013.01)

(58) Field of Classification Search
CPC ........... F16B 23/0007; F16B 23/0061; F16B 23/0069; F16B 35/06; F16B 41/005
USPC .................. 411/402, 403, 405, 910–911
See application file for complete search history.

(56) References Cited

U.S. PATENT DOCUMENTS

| | | | |
|---|---|---|---|
| 2,770,998 A | 11/1956 | Schwartz | |
| 3,134,292 A * | 5/1964 | Walton | F16B 23/0076 411/403 |

(Continued)

FOREIGN PATENT DOCUMENTS

| | | |
|---|---|---|
| FR | 1038363 | 9/1953 |
| FR | 2338628 | 8/1977 |

OTHER PUBLICATIONS

Amendment under Article 34, filed Jan. 19, 2016 in corresponding PCT application No. PCT/US2015/034653.

(Continued)

*Primary Examiner* — Roberta Delisle
(74) *Attorney, Agent, or Firm* — Intellectual Property Law Offices of Joel Voelzke, APC

(57) ABSTRACT

A tamper-resistant fastener such as a nut for a bicycle has a smoothly rounded generally dome-shaped body and one or more recesses formed into the body. Each recess has a first and open ended portion which is bounded on radially inward side but not on the radially outward side, and a second and closed ended portion which is bounded on both the radially inward side and the radially outward side. Additionally, each recess can have an additional notch formed therein, the recess and notch together forming a major and minor recess. A wall which bounds the radially inward side of the recess decreases in radial distance from the central axis of the nut as the recess proceeds in the circumferential direction. A mating wrench has teeth that match the recesses and, if present, the notches.

20 Claims, 9 Drawing Sheets

(51) Int. Cl.
   *B25B 13/48* (2006.01)
   *B25B 27/00* (2006.01)
   *B62H 5/00* (2006.01)

(56) References Cited

U.S. PATENT DOCUMENTS

| | | | |
|---|---|---|---|
| 3,302,672 A * | 2/1967 | Walton | B25B 15/004 |
| | | | 411/403 |
| 3,313,198 A | 4/1967 | Walton | |
| 3,331,274 A * | 7/1967 | Walton | F16B 23/0076 |
| | | | 411/403 |
| 3,818,731 A | 6/1974 | Waling et al. | |
| 3,929,152 A * | 12/1975 | Graham | E03B 9/02 |
| | | | 137/296 |
| 4,018,111 A | 4/1977 | Goldhaber | |
| 4,125,051 A | 11/1978 | Herkes et al. | |
| 4,302,137 A | 11/1981 | Hart | |
| 4,645,397 A | 2/1987 | Howe | |
| 4,674,306 A | 6/1987 | Halpern | |
| 4,825,669 A | 5/1989 | Herrera | |
| 4,880,344 A | 11/1989 | Henry et al. | |
| 5,033,501 A | 7/1991 | Stehling | |
| 5,097,686 A | 3/1992 | Plumer | |
| 5,199,838 A | 4/1993 | Luke et al. | |
| 5,340,256 A | 8/1994 | Morgan | |
| 5,863,166 A | 1/1999 | Young | |
| 6,341,927 B2 | 1/2002 | Hampson et al. | |
| 6,619,161 B1 | 9/2003 | Blair | |
| 7,673,482 B2 | 3/2010 | Bosman | |
| 2003/0019259 A1* | 1/2003 | Nicodemus | B25B 13/485 |
| | | | 70/233 |
| 2008/0145181 A1* | 6/2008 | Lynes | B25B 13/065 |
| | | | 411/403 |

OTHER PUBLICATIONS

International Preliminary Report on Patentability (IPRP) in corresponding PCT Application No. PCT/US15/34653.

ISR and Written Opinion dated Aug. 25, 2015 in corresponding PCT application No. PCT/US2015/034653.

\* cited by examiner

TAMPER-RESISTANT BICYCLE AXLE NUT

CROSS-REFERENCE TO RELATED APPLICATIONS

This application claims benefit U.S. Provisional Patent Application No. 62/010,125 filed Jun. 10, 2014 which is incorporated by reference as if set forth fully herein. This application is also related to U.S. Design patent application No. 29/529,126 filed Jun. 4, 2015 and U.S. Design patent application No. 29/529,127 filed Jun. 4, 2015.

BACKGROUND OF THE INVENTION

1. Field of the Invention

This invention relates to the field of fasteners. More particularly, this invention relates to the field of a tamper-resistant nut for bicycle axles.

2. Description of Related Art

To keep an object fixed and locked in place, threaded fasteners such as nuts and bolts are commonly used. Common tools, such as a wrench or variations on a wrench, are used to install and remove fasteners. Understandably, as simple as it is to secure an object with a fastener, it is just as simple to remove the fastener with a common tool. Therefore, anyone from the owner of the property to a thief who has access to these basic tools will be able to disassemble the object effortlessly. Essentially, this opens the door for unwanted removal and theft. As a result of this problem, tamper-resistant fasteners have been suggested offering elements of security against unwanted tampering. Some fasteners are shaped spherically making it difficult to grasp onto them using common tools. Others include a smooth outer surface to the product in order to reduce leverage, preventing unloosening. Also, some provide a special key so that only the owner will be able to tighten and loosen the fastener.

U.S. Pat. No. 5,097,686 entitled "Security Locking System for Vehicle Wheel Nuts" describes a cover cylinder that covers a vehicle's lug nuts and has a locking mechanism over it. Although this prevents unwanted tampering and unfastening of the nut, it requires two parts: the original nut as well as the cover cylinder as opposed to one nut with a special unfastening configuration.

U.S. Pat. No. 5,199,838 entitled "Nut for Use on Roadways, Runways, in Reinforced Concrete Construction, and the Like" describes a primarily spherical nut for use on roadway apparatuses. The spherical shape of the nut makes removal with the most common tools difficult. The nut, however, is still vulnerable to being opened with certain tools such as a spanner wrench.

U.S. Pat. No. 4,674,306 entitled "Vehicle and Assembly Locking and Wrenching Apparatus" describes a specific device for a vehicle lock, where that device is used in conjunction with a tamper-proof fastener. The apparatus provided is tailored to the unique lock. The nut has an "incised front face and arcuate sides parallel to the face, surrounded by cylindrical, annual rings that prevent the gripping and turning of the nuts." However, a universal socket wrench will be able to compromise this device.

U.S. Pat. No. 5,033,501 entitled "Fire Hydrant Cap and Actuating Tool Therefor" describes a dome shaped fire hydrant cap that provides enhanced security against removal. The cap has cutouts on the front of the dome surface to work with a special tool for fastening/removal. However, similar to EP patent 1203164, the cap is still vulnerable to unwanted tampering/removal by using a universal socket wrench as the cutouts are not hidden and are on the face of the cap.

U.S. Pat. No. 4,302,137 entitled "Anti-Tamper Fastening Means" describes a nut with a curved surface and circular openings for pins to grab and rotate the nut. This nut is covered by a sleeve to further prevent tampering. However, this adds a second component to be used with the nut and thus makes it more difficult, complicated, and slower to unfasten the nut.

U.S. Pat. No. 4,125,051 entitled "Tamperproof Fastener" describes a fastener in which the "upper surface of the head is configured to include a very short cylindrical boss, coaxial of the fastener and a plurality of ribs extending radially outward." This device uses a low profile headed design. It protects against high-profile tools; therefore, it is still susceptible to unwanted removal, just with "harder-to-find" tools.

U.S. Pat. No. 4,018,111 entitled "Tamper Resistant Fastener and Tool for Operating Same" describes a fastener with a head having a flat top surface and a smooth circular sidewall. The head has an offset opening to be filled with a complementary pin on a special key. This type of fastener is tamper resistant and prevents theft as when it is secured, it works in conjunction with a circular washer having a smooth frustoconical sidewall that covers the head.

U.S. Pat. No. 3,818,731 entitled "Nut Lock" describes a lock for preventing unauthorized removal of a nut. In a single casing, a plate having a flange at one edge is locked in a housing. The nut is threaded on a stud and the housing locked in place to prevent access to the nut. In a separate embodiment, such as where a cable having a coupling member is to be protected, the plate has an aperture shaped to receive the coupling member.

U.S. Pat. No. 7,673,482 entitled "Wheel Lock" describes an anti-theft device for preventing removal of a wheel from an axle. The wheel lock includes a cup shaped base piece with an opening to receive a wheel stud for threaded interaction with a lug nut, which will clamp the base portion to the wheel. A cup shape encloses the stud and lug nut. The cover piece interlocks with the locking portion to prevent tampering and rotation of the cover piece. The cover piece may include a flange that bears against the rim of the base portion giving the wheel lock an exterior surface that is hard to pry apart.

U.S. Pat. No. 4,645,397 entitled "Tire Theft Prevention Device" describes a device that purports to prevent theft of items having threaded nuts or the like, particularly truck tires. It includes a tamper-proof fastener having a locking cap which engages the underlying lug bolt and a seal which surrounds the locking cap and the lug nut of the tire to be secured. The seal moves freely about the locking cap and the lug nut, preventing anyone from loosening the lug nut without first breaking the seal. This invention is based on covering the lug nut thereby preventing access to the threaded nuts.

U.S. Pat. No. 4,880,344 entitled "Device for Preventing Loosening of a Member" describes a device for preventing tampering or loosening of a prismatic member such as a nut, screw head or bolt, or particularly a lock nut of a wheel of an automobile vehicle. The cap includes a transverse bottom and a cylindrical skirt in one piece with the bottom and a mechanism means for locking the prismatic member received in the cap in order to prevent the loosening of the respective member.

U.S. Pat. No. 4,825,669 entitled "Wheel Lug Nut Cover" describes a lug nut cover on a vehicle wheel secured to a vehicle. A mounting bracket and a lug nut cover both have elongated holes which makes them universal and allows them to fit a substantial number of lug bolt spacings. The cover is fitted onto special lug nuts as an extension. This mounting bracket works with the locking mechanism to hold the lug nut cover firmly in place.

U.S. Pat. No. 6,341,927 entitled "Tamper Resistant Fastener" describes a tamper resistant device that has a head with two or more tear-shaped cutouts having discontinuous sidewalls. A key having downwardly projecting pins mate into corresponding slots in the device. The specification claims that these tear-shaped cutouts prevent a tool other than the specific key provided from engaging the device and thus rotating it in a counter clockwise direction. However, other tools such as a gator grip socket wrench are able to gain leverage on the cutouts and rotate the fastener counter-clockwise. The shape of the cutouts and the slope in the cutouts open the door to other tools compromising the device as well.

U.S. Pat. No. 5,863,166 entitled "Anti-Theft Locking Device" describes a device for attaching bicycle components to the bicycle frame. The device includes a threaded bolt with a matching nut. The nut has a rotatable casing around the outer surface. The key engages with the nut giving the user access. The key and the nut share at least one spigot and at least one hole in order to engage with each other.

SUMMARY OF THE INVENTION

The present invention is of a tamper-resistant fastener which is particularly useful as a bicycle axle nut, and a mating wrench for tightening and removing the nut.

In a generally preferred embodiment, the bicycle wheel axle nut has a generally dome-shaped body having what will be called a top surface and a bottom surface, the bottom surface being the one that will rest against the bicycle fork when the axle nut is installed on a bicycle. As is conventional, the bottom surface can contain a friction surface to help keep the nut from vibrating loose during use. The top surface can be flattened.

The generally dome-shaped body of the nut includes a generally smooth, curved exterior surface that make it difficult for a conventional tool such as a crescent wrench, pliers, channel locks, or a pipe wrench, to grip.

The body has one or more, and three in the exemplary embodiment, recesses formed into the exterior surface. The recess generally increases in depth from the exterior surface of the nut and toward the central axis as the recess extends circumferentially around the nut. Preferably, the recess increases in depth as the recess extends in the nut-tightening direction, which is clockwise for typical threaded fasteners in virtually every country. Thus, as the recess extends clockwise around the fastener, the recess increases in depth toward the central axis. A mating wrench or key having curved teeth that match the curved recess(es) will be able to both tighten and loosen the nut; at the same time, however, standard tools such as crescent wrench or pliers will be unable to effectively grip the nut and thus will be unable to easily loosen it.

The recess is defined in part by a curved inner wall, the curved inner wall curving closer to the central axis as that wall extends circumferentially around the nut in a clockwise direction as described. Preferably the recess has two portions: a first and open-ended portion defined on the radially inward side by the curved inner wall and being unbounded on the radially outward side; and a second and closed-ended portion that is defined on the radially inward side by the curved inner wall including its end point, and is defined on the radially outward side by an exterior wall whose exterior surface defines in part the smooth, curved, generally dome-shaped exterior surface of the nut. Within that second section of the recess, the inner wall and outer wall are angled toward each other at an angle of preferably less than 45°, defining a channel that narrows in the clockwise direction.

Optionally, the curved inner wall that defines in part the recess has a notch formed therein, the notch being smaller than the recess. The notch can be thought of as being part of the recess. Preferably the notch has a volume that is less than one quarter of a volume of the recess including the notch. The nut thus has both a major (larger) recess and a minor (smaller) recess. The notch extends inwardly from the curved inner wall, and can optionally extend circumferentially as well such that its directional vector includes both a radially inward component and a circumferentially clockwise component. The walls that define the notch define a narrowing channel as one moves from the opening of the notch to its innermost extent. The minor recess, taken together with its mating tooth on the associated wrench, provides for additional grip of the wrench on the nut.

Preferably the recesses are open at their top sides, and the walls that define the recess are generally vertical, so that the wrench can be slid downward directly onto the nut for ease of use. The recesses including the notches can be substantially identically shaped and evenly spaced such as at three evenly spaced locations around the nut, or the recesses including the notches can be differently shaped from one another, and/or placed at differing locations around the nut.

The recess is generally bounded on the bottom by a floor of the recess, the floor of the recess being located above the bottom surface of the nut. Preferably the floor of the recess is generally flat.

A threaded central bore for the wheel axle preferably extends all the way through the nut. However, for applications in which the wheel axle is not long enough to extend all the way through the nut when installed, it is not strictly necessary that the central bore and thread extend all the way through the nut. Preferably the nut is at least 50% as high as it is wide at its widest point, i.e., its greatest diameter which is generally at its bottom surface.

A manufacturer can manufacture various nuts and mating wrenches in which the following parameters are varied slightly from one nut-and-wrench set sold to a consumer to the next: the position, shape, and number of major recesses; and the position, shape, and number of minor recesses. The nuts, together with their mating wrench, would be sold as a unit. Generally speaking the wrench from one set of nuts will not mate with a different set of nuts. The wrench therefore acts as a unique key for a particular set of nuts, the key working for that set of nuts and that set of nuts only. In this way, a large number of uniquely mating nut-and-wrench sets can be manufactured and sold, with each set of nuts being removable with only its mating wrench. A would-be bicycle wheel thief would therefore need to purchase or form and carry a large number of wrenches in order to effectively remove bicycle wheels protected by a set of axle nuts according to the invention, and even then, the additional time that it would require for the thief to find the correct wrench for a particular axle nut set would greatly deter the would-be thief.

The nut and/or the wrench of the present invention can be used in, or applied to, other applications than merely bicycle axles, although bicycle axles are foreseen as being particularly well suited for use with the invention.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
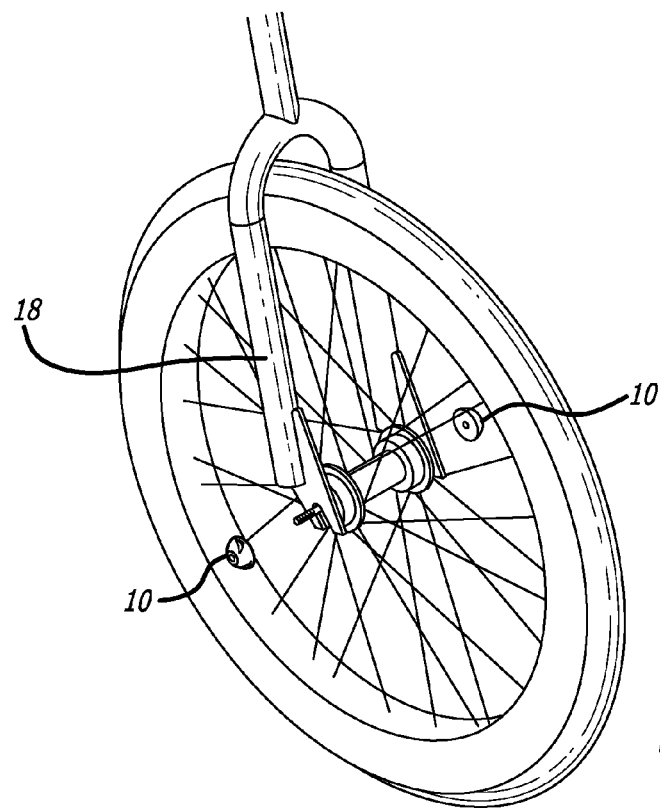
FIG. 1 is an exploded oblique view of a bicycle wheel having a conventional solid axle, with two of the nuts of the present invention being used to secure the axle.

FIG. 1 is an exploded oblique view of a bicycle wheel having a conventional solid axle 19, with two of the bicycle axle nuts 10 of the present invention being used to secure the axle. Nut 10 has a threaded central bore that screws onto threaded bicycle axle 19 to secure axle 19 and hence secure the bicycle wheel to the bicycle wheel fork 18.

Figure 2:
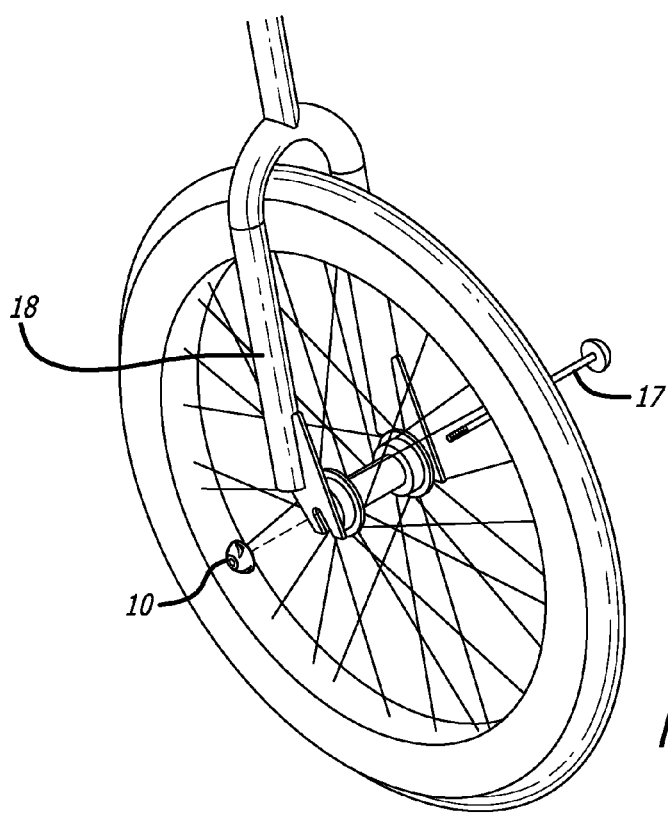
FIG. 2 is an exploded oblique view of a bicycle wheel having a replacement skewer and a quick release mechanism, with one of the nuts of the present invention being used to secure the axle.

FIG. 2 is an exploded oblique view of a bicycle wheel having a replacement skewer 17 for a quick release mechanism, with one of the nuts 10 of the present invention being used to secure the replacement skewer 17.

Figure 3:
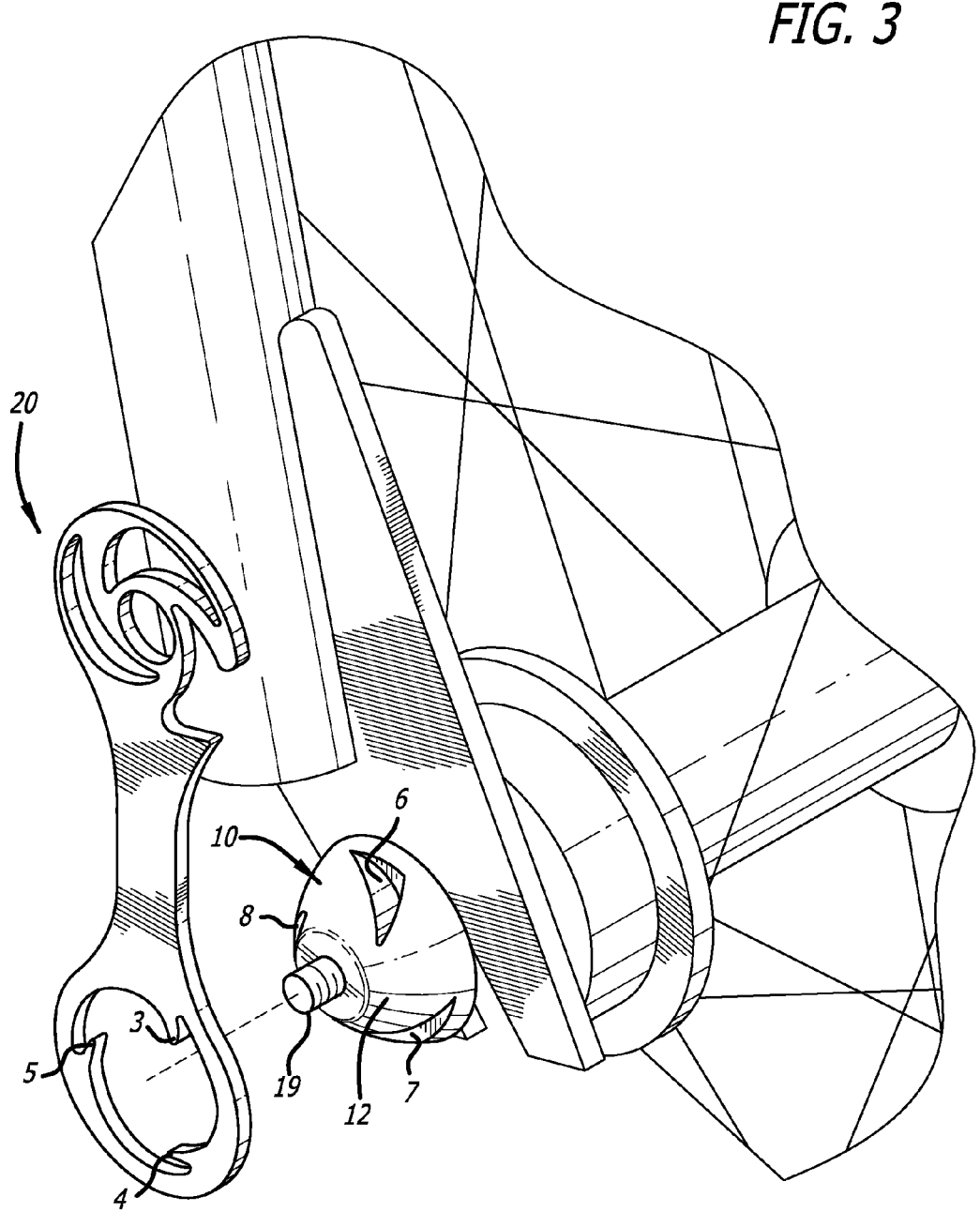
FIG. 3 is an oblique view of a bicycle axle having a nut according to a first embodiment of the present invention installed thereon to secure the axle, and showing in exploded form how the mating wrench would be used on the nut.

FIG. 3 is an oblique view of a bicycle axle 19 having a nut 10 according to a first embodiment of the present invention installed thereon to secure the axle, and showing in exploded form how the mating wrench 20 would be used on nut 10. In this first embodiment, nut 10 has three recesses 6/7/8 generally evenly spaced around the circumference of the nut. Each recess 6/7/8 defines only a major recess, or simple recess. The shape of recesses 6/7/8 will be discussed in greater detail below with reference to FIGS. 5 and 6, and further with references to FIGS. 8, 10, and 12 in which the second embodiment of the nut contains similar recesses as recesses 6/7/8 but also include minor recesses.

Figures 7, 8:
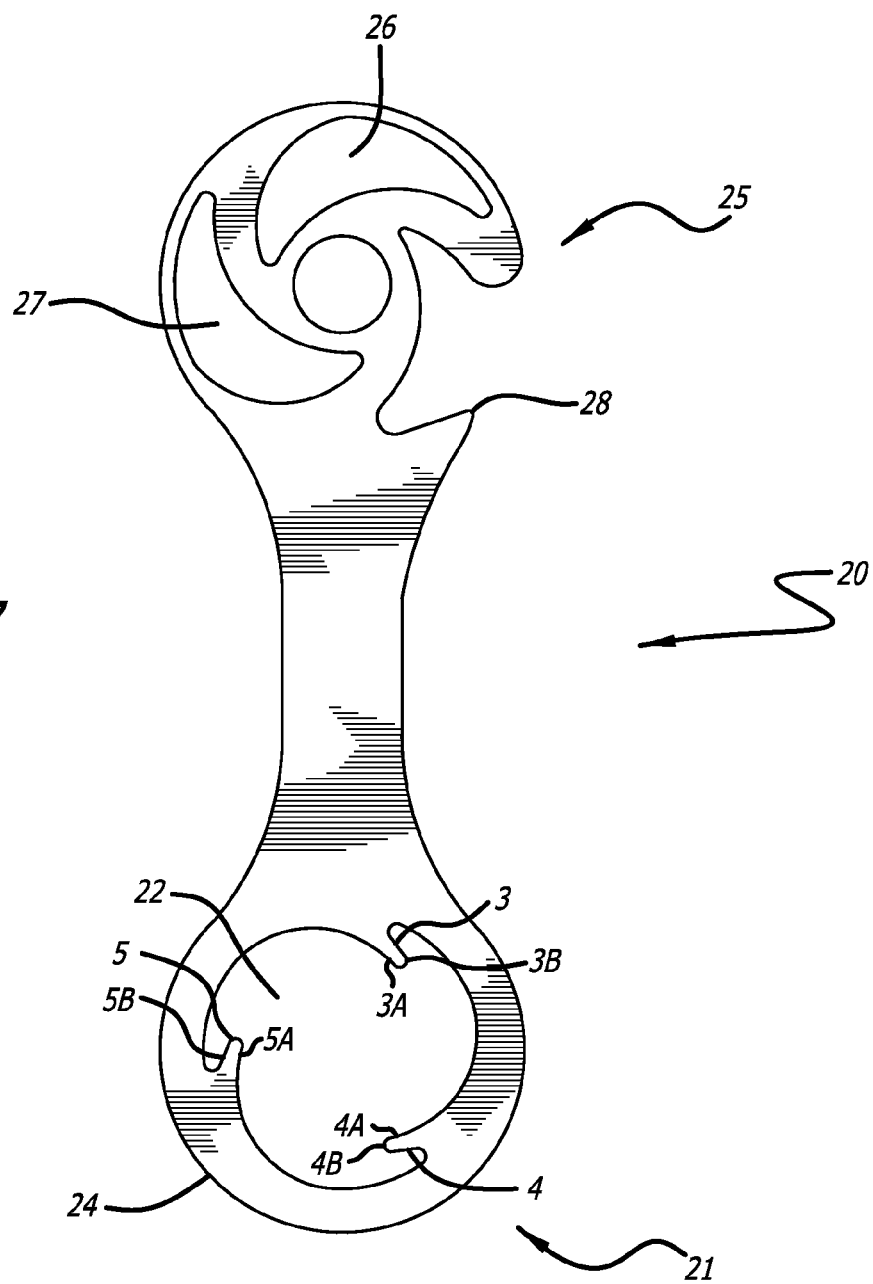
FIG. 7 is a top plan view of the wrench shown in FIG. 3, and which mates with the nut of FIG. 5.
FIG. 8 is an end elevation view of the wrench shown in FIG. 7.

Mating wrench 20 has a first and working end 21 (FIG. 7) which mates with nut 10. A second and handle end 25 of wrench 20 may also mate with nut 10, and/or may have decorative elements such as decorate cutouts 26 and 27, and/or an unrelated functional structure such as bottle opener 28. Teeth 3/4/5 extend both radially inwardly and circumferentially clockwise from a generally circular outer periphery of working end 21. In this preferred embodiment because teeth 3/4/5 extend only radially inwardly, and not downwardly as in some prior art solutions, wrench 20 can be kept flat and thin as seen in FIG. 8. As an example, the wrench can have a thickness of 5 mm or less, or even 4 mm or less. This is an advantage because for bicycle riders, their tools should be as small, lightweight, and compact as possible. This is especially true for tools used for removing and reinstalling wheels and tires, which bicycle riders need to do when repairing flat tires which are unfortunately all too common occurrences on bicycle rides due to thorns, broken glass, and other small road hazards. Bicycle riders must therefore generally carry those tools with them at all times.

Figure 4:
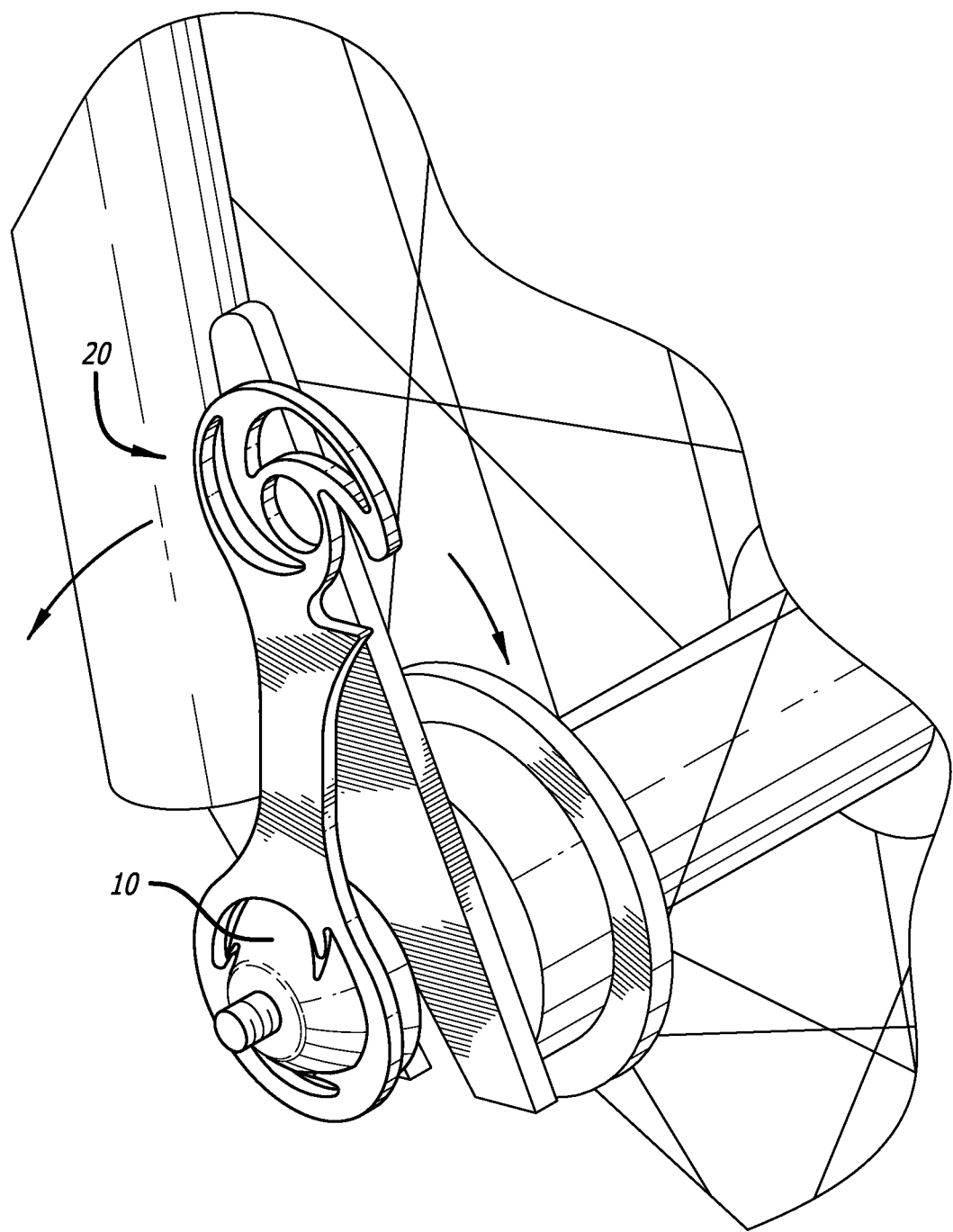
FIG. 4 is an oblique view of the bicycle axle, nut, and wrench of FIG. 3, but showing the wrench being applied to the nut.

FIG. 4 is an oblique view of the bicycle axle 19, nut 10, and wrench 20 of FIG. 3, but showing wrench 20 being applied to nut 10. Teeth 3/4/5 mate with recesses 6/7/8, respectively. Because the walls that define recesses 6/7/8 are generally vertical walls (or horizontal walls in the particular orientation shown in the figure), wrench 20 slides directly downward onto nut 10. Wrench 20 can now be used to tighten nut 10 onto axle 19 or to remove it.

Figure 5:
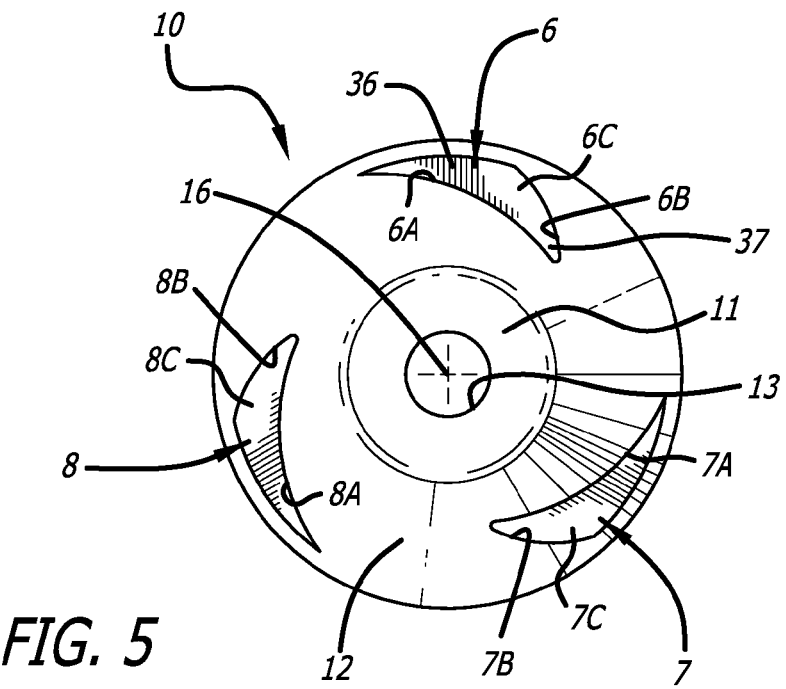
FIG. 5 is a top plan view of just the nut according to the first embodiment shown in FIG. 3.

FIG. 5 is a top plan view of just the nut according to the first embodiment shown in FIG. 3. Nut 10 includes a threaded central bore 13 along its central longitudinal axis 16 in order to threadingly engage threaded bicycle axle 19 or quick release replacement skewer 17. In the embodiment shown nut 10 also has a flat top surface 11. In general, the top surface of the nut could be either flattened as shown or smoothly rounded. The flattened top surface 11, however, helps to prevent the very top of nut 10 from being accidentally damaged and bent inwardly, which would interfere with its ability to thread smoothly onto axle 19.

Figure 6:
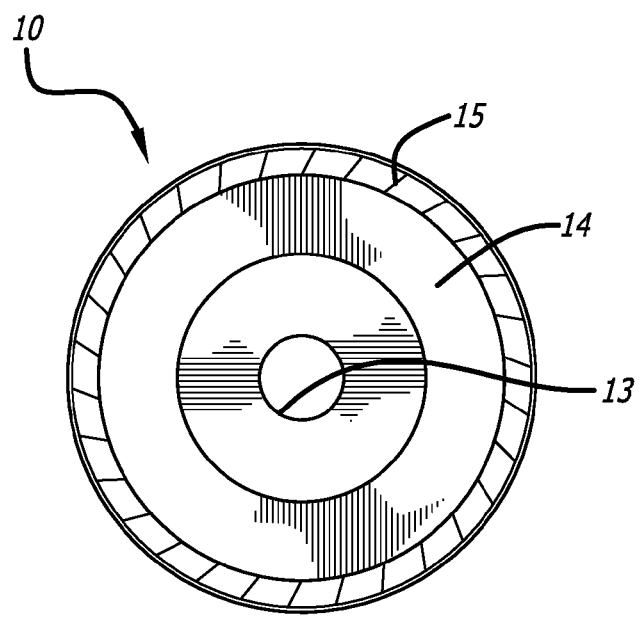
FIG. 6 is a bottom plan view of the nut of FIG. 5.

Each recess 6/7/8 preferably has a first and open-ended portion 36, and a second and closed-ended portion 37. In the open-ended portion 36, recess 6 is bounded on its radially inward side by convexly curved inner wall 6A, and on its bottom side by floor 6C. Floor 6C of recess 6 is preferably mostly or completely flat, i.e., parallel to bottom surface 14 (FIG. 6). Thus, the open-ended portion 36 of recess 6 is bounded on its radially inward side by curved inner wall 6A, and on its bottom by floor 6C, and is not otherwise bounded. Curved inner wall 6A becomes gradually closer to central axis 16 as it extends circumferentially, preferably as it extends circumferentially in the tightening direction which is nearly universally the clockwise direction. Thus, recess 6 increases in radial depth as the recess extends circumferentially in the tightening direction.

Floor 6C is located preferably in the lower half of nut 10, and more preferably approximately less than or equal to approximately one quarter of the way from bottom surface 14 to top surface 11 of nut 10.

The second and closed-ended portion 37 of recess 6 is also bounded on the radially inward side by curved inner wall 6A of decreasing radius, and by floor 6C. It is further bounded on its radially outward side by exterior wall 6B having a concavely shaped inwardly-facing wall Inner curved wall 6A and exterior wall 6B are angled toward each other at an angle φ of preferably less than 45°, and even less than 30°, meeting at a clockwise-most and inner-most extent of recess 6. Preferably curved inner wall 6A and the inner surface of external wall 6B extend vertically or generally vertically, so that wrench 10 including tooth 3 can slide straight up and down over nut 10 for ease of use. Recesses 7 and 8, including their inner curved walls 7A and 8A, their exterior walls 7B and 8B, and their floors 7C and 8C, can be identical to the corresponding features in recess 6. Alternatively, they can be different to allow for more unique variations of nut 10 and wrench 20. Each unique recess pattern for nut 10 and its corresponding wrench 20 constitutes a unique security signature for that nut-and-wrench set.

The recesses 6/7/8 including the notches 6'/7'/8' described later with respect to FIGS. 9-14 can be substantially identically shaped and evenly spaced such as at three evenly spaced locations (e.g., at the 0°, 120°, and 240° positions) around the nut in which case the wrench can be applied to the nut at any one of three different yet functionally identical positions on the nut. Alternatively, the recesses 6/7/8 including the notches 6'/7'/8' can be different from one another, and/or placed at non-uniform spacings around the nut (e.g., at the 0°, 100°, and 240° positions) such that the spacings between the recesses are non-uniform, in which case the wrench can be applied at only a single position on the nut, thus making the nut and wrench combination slightly more difficult to use but increasing the number of unique combinations available and thus increasing the security of the nut and wrench system.

FIG. 6 is a bottom plan view of the nut 10 of FIG. 5. Bottom surface 14 can include an area 15 that is raised and/or knurled, shingled or otherwise roughened to increase the grip of nut 10 onto the bicycle's wheel fork 18 to help prevent unintended loosening of nut 10.

FIG. 7 is a top plan view of the key or wrench 20 shown in FIG. 3, and which mates with nut 10 of FIG. 5. Working end 21 of wrench 20 has a central hole 22, and inwardly projecting teeth 3/4/5 that extend from generally circular peripheral wall 24. When wrench 20 is installed on nut 10, inward surface 3A of tooth 3 abuts curved inner wall 6A of recess 6, and outer surface 3B of tooth 3 abuts the interior surface of exterior wall 6B. Corresponding tooth surfaces 4A/4B and 5A/5B perform corresponding functions relative to recesses 7 and 8, respectively. When wrench 10 is turned counter-clockwise to loosen the nut, inward surfaces 3A/4A/5A of the wrench tighten and push counter-clockwise against corresponding curved walls 6A/7A/8A of the nut, thus unscrewing the nut.

FIG. 8 is an end elevation view of the wrench shown in FIG. 7. The wrench is flat having no upward or downward projections. In the exemplary embodiment the wrench is less 5 mm thick, and can be made less than 4 mm thick, or even 3 mm thick or thinner depending on the strength of the metals chosen.

Figure 9:
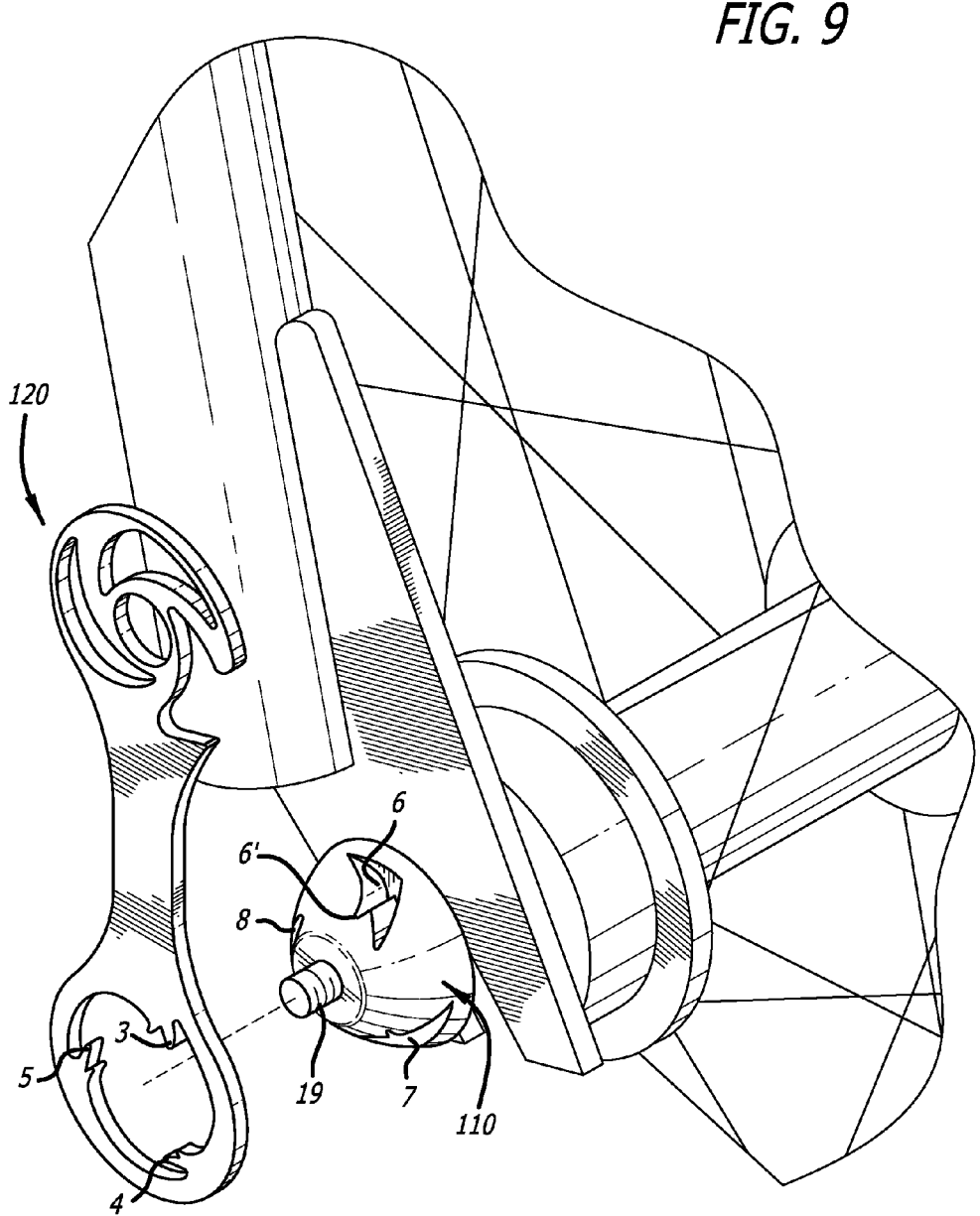
FIG. 9 is an oblique view of a bicycle axle having a nut according to a second embodiment of the present invention installed thereon to secure the axle, and showing in exploded form how the mating wrench would be used on the nut.

FIG. 9 is an oblique view of a bicycle axle having a nut 110 according to a second embodiment of the present invention installed thereon to secure the bicycle axle 19, and showing in exploded form how the mating wrench 120 would be used on nut 110. Nut 110 includes three major recesses 6/7/8. The three recesses may be evenly spaced about nut 110, or they may be unevenly spaced, as discussed above with respect to the first embodiment.

Figure 10:
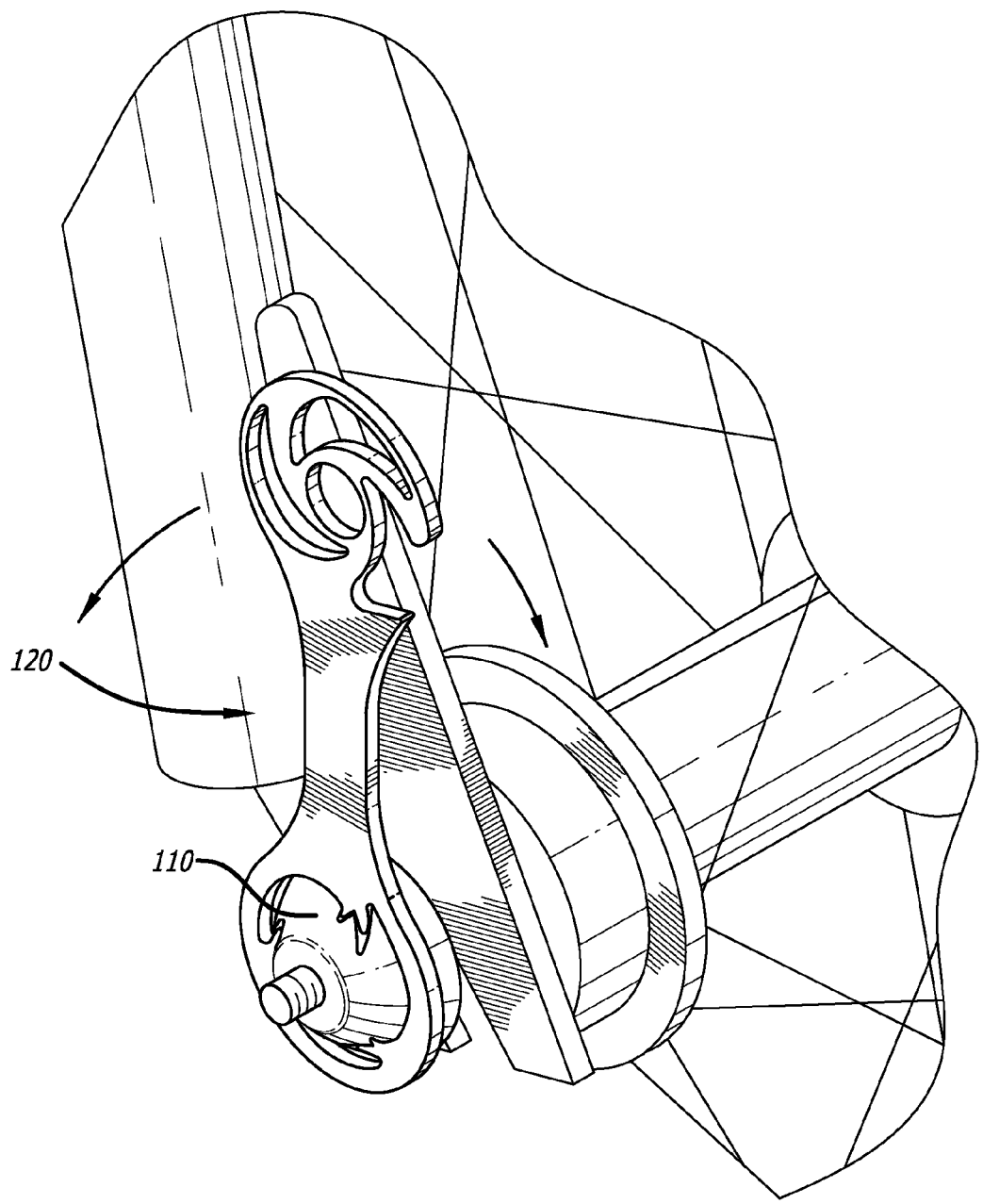
FIG. 10 is an oblique view of the bicycle axle, nut, and wrench of FIG. 9, but showing the wrench being applied to the nut.

FIG. 10 is an oblique view of the bicycle axle, nut, and wrench of FIG. 9, but showing the wrench 120 being applied to the nut 110.

Figure 11:
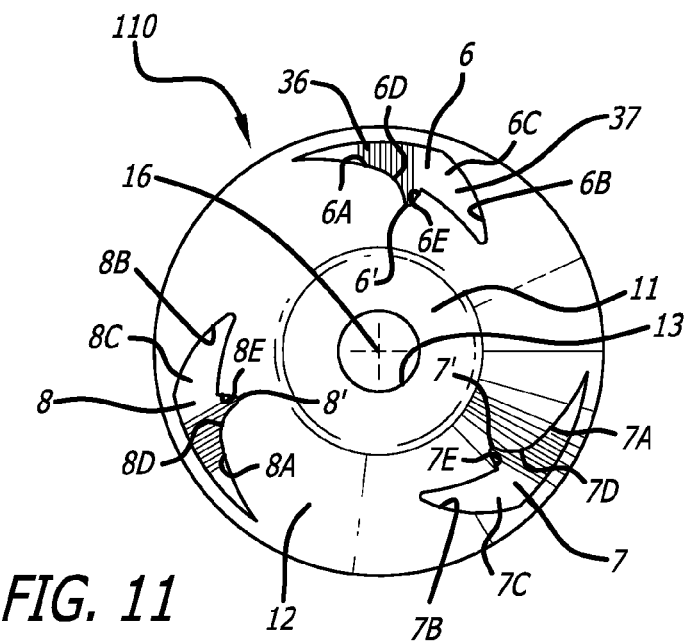
FIG. 11 is a top plan view of just the nut according to the second embodiment shown in FIG. 9.

FIG. 11 is a top plan view of just the nut 110 shown in FIG. 9. In recesses 6/7/8: inner curved walls 6A/7A/8A generally have similar shapes and functions as inner curved walls 6A/7A/8A in the first embodiment; exterior walls 6B/7B/8B generally have similar shapes and functions as exterior walls 6B/7B/8B in the first embodiment; and floors 6C/7C/8C generally have similar shapes and functions as floors 6C/7C/8C in the first embodiment. The prior description of nut 10 of the first embodiment, including potential variations thereon, therefore also generally applies to nut 110 of this second embodiment.

In this second embodiment, however, in addition to recess 6 which defines a major recess, curved inner wall 6A also has a notch 6' formed therein which defines a minor recess, and which will be referred to herein as being a part of major recess 6. Notch 6' is defined in part by notch walls 6E and 6D, with those notch walls meeting at a farthest and radially inward-most extent of notch 6'. Notch wall 6E and thus notch 6' can extend in a purely radially inward direction, or can extend both radially inwardly as well as circumferentially such as circumferentially clockwise. Notch wall 6D can be either curved or flat. Minor recess 6' preferably has a volume that is less than one quarter of the total volume of major recess 106 including minor recess 6'.

Figure 12:
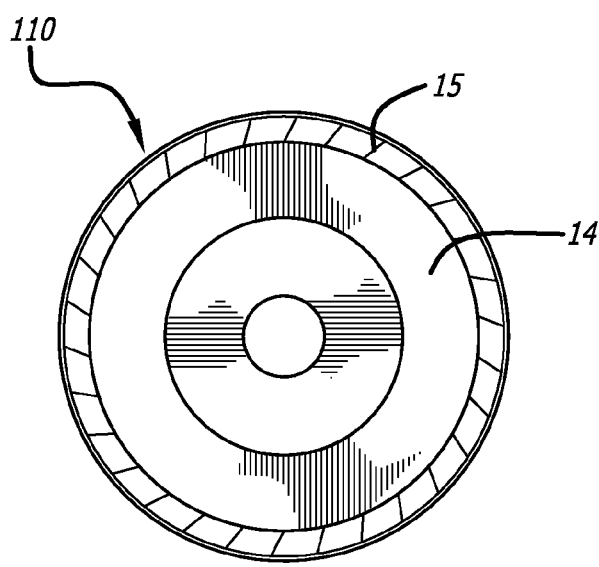
FIG. 12 is a bottom plan view of the nut of FIG. 11.

FIG. 12 is a bottom plan view of the nut of FIG. 11. As in the first embodiment, bottom surface 14 can include an area 15 that is raised and/or knurled, shingled or otherwise roughened to increase the grip of nut 110 onto the bicycle's wheel fork to help prevent unintended loosening of nut 110.

Figure 13:
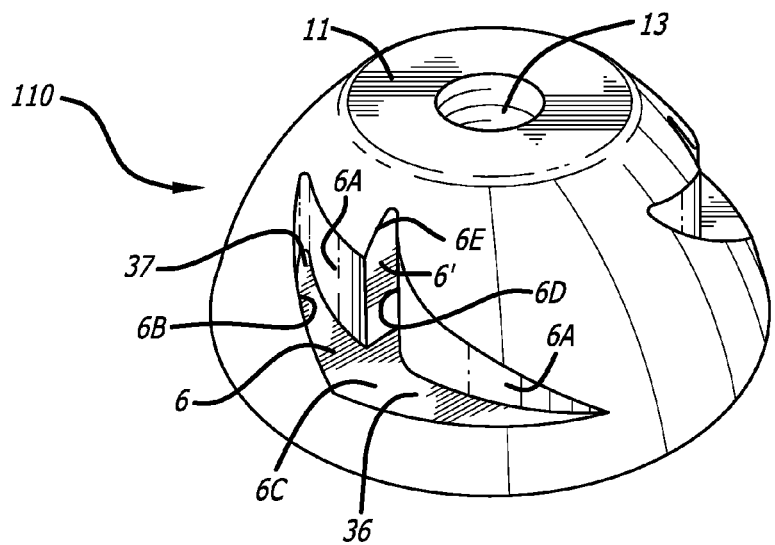
FIG. 13 is an oblique view of the nut of FIG. 11.

FIG. 13 is an oblique view of the nut of FIG. 11, providing perhaps the clearest view of major recess 6 including floor 6C, inner curved wall 6A, exterior wall 6B, and notch or minor recess 6' defined in part by notch walls 6E and 6D.

Figure 14:
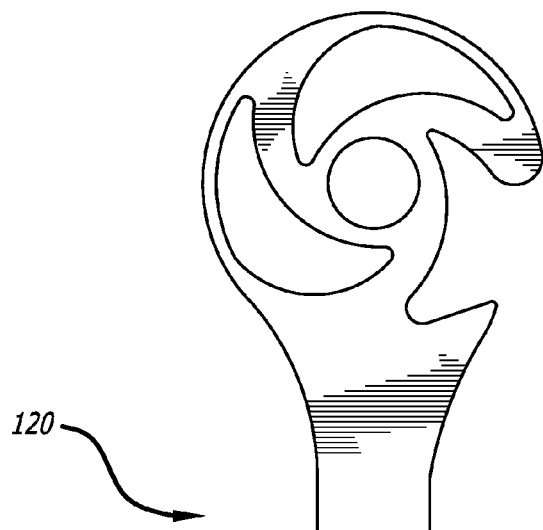
FIG. 14 is a top plan view of the wrench shown in FIG. 9, and which mates with the nut of FIG. 11.

FIG. 14 is a top plan view of the wrench 120 shown in FIG. 9, and which mates with the nut 110 of FIG. 11. Major teeth 3/4/5 slide into and thus mate with corresponding major recesses 6/7/8, and minor teeth 3'/4'/5' slide into and thus mate with corresponding minor recesses 6'/7'/8'.

Because the walls that define recesses 6/7/8 and the walls that define notches 6'/7'/8' are generally vertical walls, wrench 120 slides directly downward onto nut 110.

Together, major recess 6 and minor recess 6' in nut 110, together with the corresponding mating major tooth 3 and minor tooth 3' in wrench 120, provide a superior grip for the wrench on the nut than the recess 6 and single tooth 3 in the first embodiment of nut 10 and wrench 20, according to tests conducted by the inventors.

As in the first embodiment, the recesses including the notches can be substantially identically shaped and evenly spaced such as at three evenly spaced locations (e.g., at the 0°, 120°, and 240° positions) around the nut in which case the wrench can be applied to the nut at any one of three different positions on the nut. Alternatively, the recesses 6/7/8 including the notches 6'/7'/8' can be different from one another, and/or placed at non-uniform spacings around the nut (e.g., at the 0°, 100°, and 240° positions) such that the spacings between the recesses are non-uniform, in which case the wrench can be applied at only a single position on the nut, thus making the nut and wrench combination slightly more difficult to use but increasing the number of unique combinations available and thus increasing the security of the nut and wrench system.

It will be understood that the terms "generally," "approximately," and "substantially," as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are to be understood as applying to parts that are oriented in the particular orientations shown in the drawings and described in the specification, upside down from that orientation, or any other rotational variation.

It will be appreciated that the term "present invention" as used herein should not be construed to mean that only a single invention having a single essential element or group of elements is presented. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A tamper-resistant bicycle axle nut comprising:
   a generally dome-shaped body, the body having:
   a bottom surface;
   a top surface;
   a central axis;
   a central bore along the central axis, the central bore extending at least part way through the body from the bottom surface toward the top surface; and
   a curved outer peripheral wall extending circumferentially around the body, the curved outer peripheral wall having a recess therein;
   the recess increasing in radial depth as it extends circumferentially in a first direction around the body;
   the recess having:
   a first and open-ended portion that is not bounded on a radially outer side by the outer peripheral wall of the body; and
   a second and closed-ended portion in which the recess extends between the outer peripheral wall of the body and a curved inner wall, the closed-end portion being bounded on a radially inward side by the curved inner wall and bounded on a radially outward side by the curved outer wall to define a channel therebetween.

2. The bicycle axle nut of claim 1 wherein the curved inner wall of the second and closed-ended portion of the recess increases in radial depth as it extends circumferentially in the first direction around the body.

3. The bicycle axle nut of claim 1 wherein the second portion of the recess is open at its top side.

4. The bicycle axle nut of claim 1 wherein the recess has a notch extending radially inwardly therefrom, the recess and the notch together defining a major recess and a smaller minor recess extending inwardly from the major recess.

5. The bicycle axle nut of claim 1 wherein the recess defines a first recess, the nut further having second and third recesses shaped substantially identically with the first recess, the three recesses being separate from each other and dispersed from each other around the body.

6. The bicycle axle nut of claim 1 wherein the recess defines a first recess, the nut further having second and third recesses shaped substantially identically with the first recess, the three recesses being separate from each other and dispersed from each other around the body at non-uniform locations such that the spacings between recesses are non-uniform.

7. The bicycle axle nut of claim 1, the nut having a plurality of said recesses, each recess having a notch extending therefrom in a radially inward direction.

8. In combination, the bicycle axle nut of claim 7 and a flat wrench having protrusions that extend inwardly to mate with the recesses so that the wrench can be effectively used to both tighten and remove the nut, the protrusions not extending downwardly and therefore not increasing an overall thickness of the wrench.

9. The bicycle axle nut of claim 1 wherein, in the second portion of the recess, the curved inner wall and the outer peripheral wall converge toward each other at an acute angle of less than 45°, the converging curved inner wall and outer peripheral wall defining a narrowing channel therebetween.

10. A tamper-resistant bicycle axle nut comprising:
    a generally dome-shaped body, the body having:
    a central axis therethrough;
    a threaded central bore disposed along the central axis;
    a generally smooth, rounded peripheral wall, the peripheral wall having a recess therein, the recess having at least a first part thereof that extends toward the central axis a greater distance than does a second part of the recess; and
    an inner wall that defines in part the recess;
    wherein:
    the inner wall has a notch therein; and
    the notch extends radially inwardly from the inner wall, the notch defining an acutely angled recess for mating with a correspondingly acutely angled tooth.

11. The bicycle axle nut of claim 10 wherein:
    at a clockwise-most extent of the recess, the recess defines a narrowing channel defined by the peripheral wall and the inner wall.

12. The bicycle axle nut of claim 10 wherein a floor of the recess is flat.

13. The bicycle axle nut of claim 10 wherein the body is at least 50% as high as it is wide at its greatest diameter.

14. The bicycle axle nut of claim 10 wherein the second part of the recess is bounded on three sides by a floor of the recess, the peripheral wall, and the inner wall.

15. A tamper-resistant bicycle axle nut comprising:
    a generally dome-shaped body, the body having:
    a central axis therethrough;
    a threaded central bore disposed along the central axis; and
    a smooth, rounded peripheral wall, the peripheral wall having a recess therein, the recess increasing in radial depth as it extends circumferentially in a first direction around the body, the recess defined in part by an inner wall that is located an increasingly smaller distance from the central axis as it extends in the first direction;
    the recess having:
    a first portion that is bounded on a radially inward side by the inner wall, and not bounded on an opposite and radially outward side; and
    a second portion that is bounded on a radially inward side by the inner wall, and is bounded on an opposite and radially outward side by an exterior wall to define a channel therebetween.

16. The bicycle axle nut of claim 15 wherein a majority of a floor of the recess is flat.

17. The bicycle axle nut of claim 15 wherein all of a floor of the recess is parallel to a plane that defines a bottom surface of the nut.

18. The bicycle axle nut of claim 15 wherein the recess includes a notch that is formed in the inner wall, the notch extending radially inwardly, the notch defining an acutely angled recess for mating with a correspondingly acutely angled tooth.

19. The bicycle axle nut of claim 15 wherein the recess defines a first recess, and the nut further has second and third recesses, each recess being substantially identically shaped.

20. The bicycle axle nut of claim 15 wherein, in the second portion of the recess, the curved inner wall and the outer peripheral wall converge toward each other at an acute angle of less than 45°, the converging curved inner wall and outer peripheral wall defining a narrowing channel therebetween.

* * * * *